United States Patent
Cheong et al.

(10) Patent No.: US 10,048,010 B2
(45) Date of Patent: Aug. 14, 2018

(54) HEAT EXCHANGER AND METHOD FOR MANUFACTURING SAME

(71) Applicant: Samsung Electronics Co., Ltd., Suwon-si (KR)

(72) Inventors: Young Min Cheong, Seoul (KR); Soo Young Lee, Yongin-si (KR); Seong Ho Kil, Seongnam-si (KR); Moon Il Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/124,622

(22) PCT Filed: Mar. 17, 2015

(86) PCT No.: PCT/KR2015/002568
§ 371 (c)(1),
(2) Date: Sep. 8, 2016

(87) PCT Pub. No.: WO2015/142028
PCT Pub. Date: Sep. 24, 2015

(65) Prior Publication Data
US 2017/0016677 A1    Jan. 19, 2017

(30) Foreign Application Priority Data

Mar. 19, 2014   (KR) ........................ 10-2014-0032198

(51) Int. Cl.
*F28D 7/06*    (2006.01)
*F28D 1/053*   (2006.01)
(Continued)

(52) U.S. Cl.
CPC .......... *F28D 1/05391* (2013.01); *B23P 15/26* (2013.01); *B29C 45/14598* (2013.01);
(Continued)

(58) Field of Classification Search
CPC ........ F28F 9/0219; F28F 19/00; F28F 21/084; F28F 21/04; F28F 21/085; F28F 21/081;
(Continued)

(56) References Cited

U.S. PATENT DOCUMENTS 4,638,852 A * 1/1987 Basseen ............... B01D 53/265
165/113
4,693,302 A * 9/1987 Dodds ................... B01D 1/0047
165/111
(Continued)

FOREIGN PATENT DOCUMENTS

| CN | 1479070 A | 3/2004 |
| CN | 101501436 A | 8/2009 |

(Continued)

OTHER PUBLICATIONS

International Search Report dated Jun. 11, 2015 in corresponding International Application No. PCT/KR2015/002568.
(Continued)

*Primary Examiner* — Davis Hwu
(74) *Attorney, Agent, or Firm* — Staas & Halsey LLP

(57) ABSTRACT

The heat exchanger includes at least one tube array in which refrigerant flows, the tube array includes a plurality of tubes each having a channel formed therein, and connection members coupled to opposite ends of the tubes so as to interconnect the tubes, and the tubes are injection molded integrally with the connection members.

15 Claims, 19 Drawing Sheets

(51) Int. Cl.
| | |
|---|---|
| *F28F 9/02* | (2006.01) |
| *F28F 1/00* | (2006.01) |
| *F28F 9/16* | (2006.01) |
| *F28F 9/26* | (2006.01) |
| *F28F 21/06* | (2006.01) |
| *F28F 21/08* | (2006.01) |
| *F28F 1/24* | (2006.01) |
| *F28F 1/36* | (2006.01) |
| *B29C 45/14* | (2006.01) |
| *B23P 15/26* | (2006.01) |
| *B29C 45/26* | (2006.01) |
| *B29C 45/33* | (2006.01) |
| *B29K 105/00* | (2006.01) |
| *B29K 705/10* | (2006.01) |
| *B29L 31/18* | (2006.01) |
| *F28D 21/00* | (2006.01) |
| *F28F 1/26* | (2006.01) |
| *F28F 1/34* | (2006.01) |

(52) U.S. Cl.
CPC ...... *B29C 45/14614* (2013.01); *B29C 45/261* (2013.01); *B29C 45/2602* (2013.01); *B29C 45/2628* (2013.01); *B29C 45/33* (2013.01); *F28F 1/00* (2013.01); *F28F 1/24* (2013.01); *F28F 1/36* (2013.01); *F28F 9/02* (2013.01); *F28F 9/0224* (2013.01); *F28F 9/0226* (2013.01); *F28F 9/16* (2013.01); *F28F 9/262* (2013.01); *F28F 21/062* (2013.01); *F28F 21/067* (2013.01); *F28F 21/085* (2013.01); *B29K 2105/258* (2013.01); *B29K 2705/10* (2013.01); *B29L 2031/18* (2013.01); *F28D 2021/007* (2013.01); *F28D 2021/0061* (2013.01); *F28D 2021/0071* (2013.01); *F28F 1/26* (2013.01); *F28F 1/34* (2013.01); *F28F 2230/00* (2013.01); *F28F 2255/143* (2013.01); *F28F 2265/16* (2013.01)

(58) Field of Classification Search
CPC ... F28F 9/0224; F28F 9/0226; F28D 1/05391; F28D 2021/0061; F28D 7/06; F28D 7/14; B29C 45/14598; B29C 45/261; B29C 45/2602; B29C 45/2628

USPC .......................................................... 165/176
See application file for complete search history.

(56) References Cited

U.S. PATENT DOCUMENTS

| | | | |
|---|---|---|---|
| 4,923,004 A | | 5/1990 | Fletcher et al. |
| 5,425,414 A | * | 6/1995 | Bradley, Jr. ........... F25D 17/067 |
| | | | 165/150 |
| 5,518,070 A | * | 5/1996 | Kato .................... F28D 1/05391 |
| | | | 165/134.1 |
| 5,582,238 A | * | 12/1996 | Plaschkes ............. F28F 9/0214 |
| | | | 165/171 |
| 2003/0116309 A1 | | 6/2003 | Dispenza et al. |
| 2008/0121387 A1 | | 5/2008 | Taniguchi et al. |
| 2010/0276133 A1 | * | 11/2010 | Ojiro ................... B29C 45/1711 |
| | | | 165/181 |

FOREIGN PATENT DOCUMENTS

| | | |
|---|---|---|
| EP | 0 191 956 A1 | 8/1986 |
| EP | 0 305 702 A1 | 3/1989 |
| JP | 58-178194 | 10/1983 |
| JP | 60-101029 | 6/1985 |
| JP | 2008-304108 | 12/2008 |
| KR | 10-1999-0001084 | 1/1999 |
| KR | 10-2004-0018775 | 3/2004 |
| KR | 10-0513008 | 8/2005 |
| KR | 10-2008-0014498 | 2/2008 |
| KR | 10-0854572 | 8/2008 |
| WO | WO 2008/018712 A1 | 2/2008 |

OTHER PUBLICATIONS

Extended European Search Report issued by the European Patent Office dated Oct. 30, 2017 in corresponding European patent application No. 15764496.4.
Chinese Office Action dated Mar. 19, 2018, in corresponding Chinese Patent Application No. 201580014862.2.
European Office Action dated Mar. 16, 2018, in corresponding European Patent Application No. 15 764 496.4.

* cited by examiner

【FIG. 1】
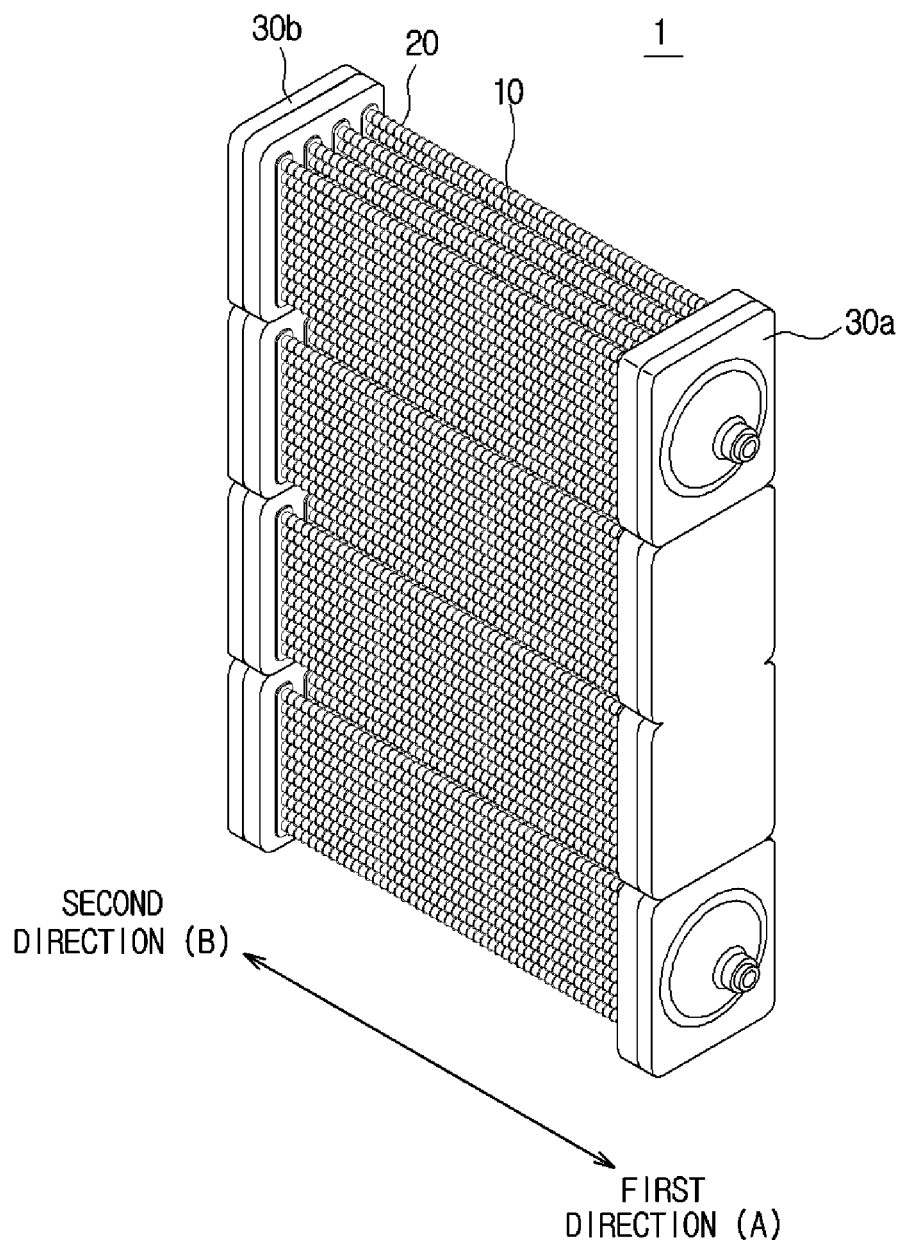

[FIG. 2]
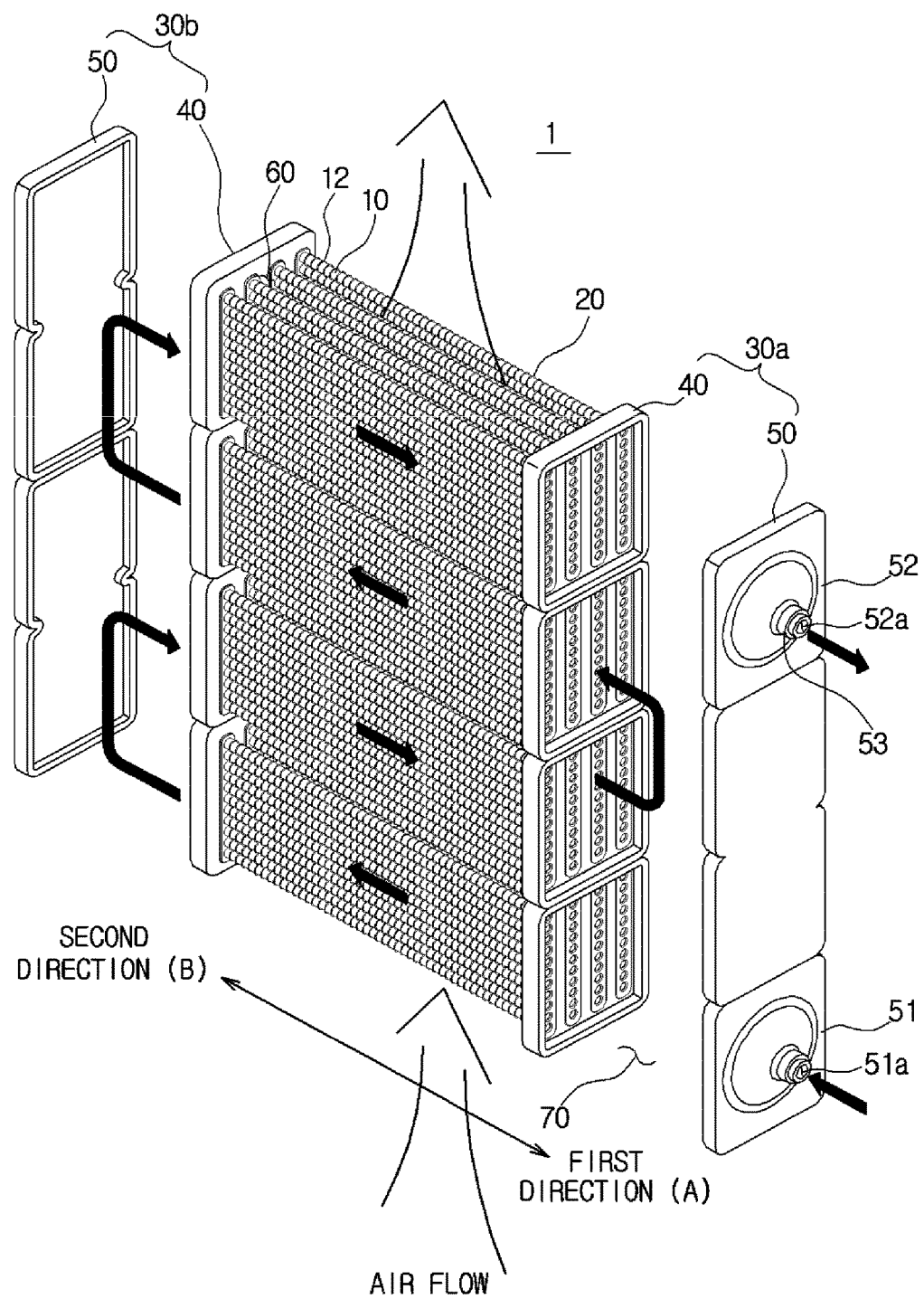

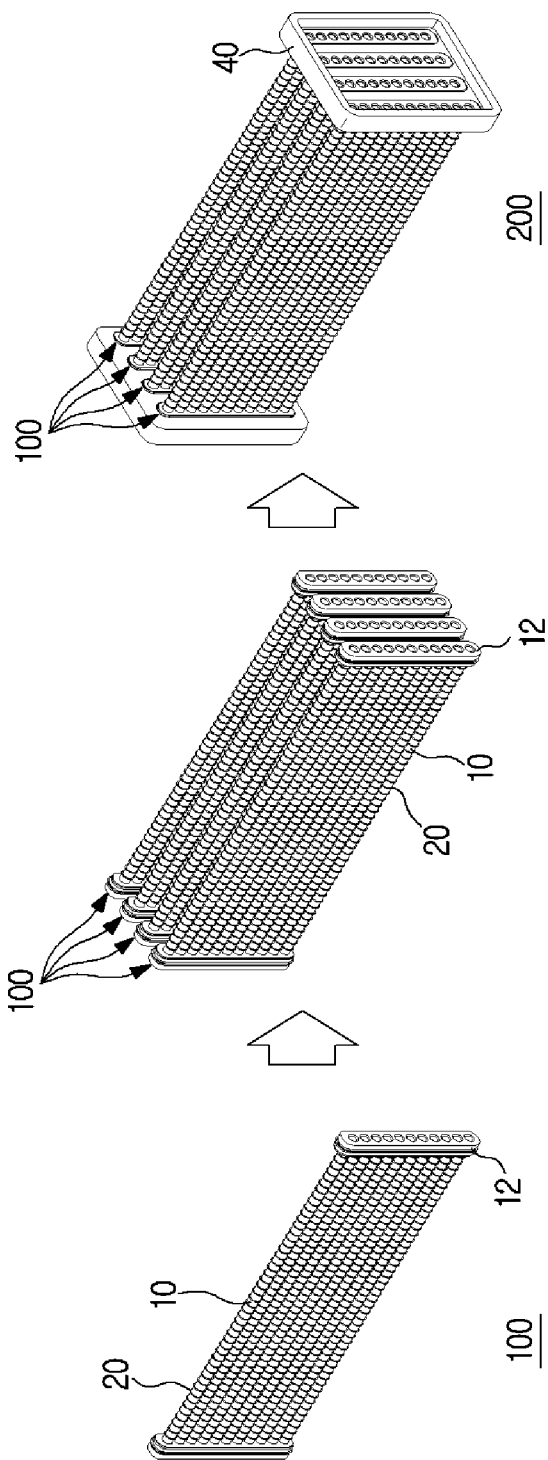

[FIG. 4]
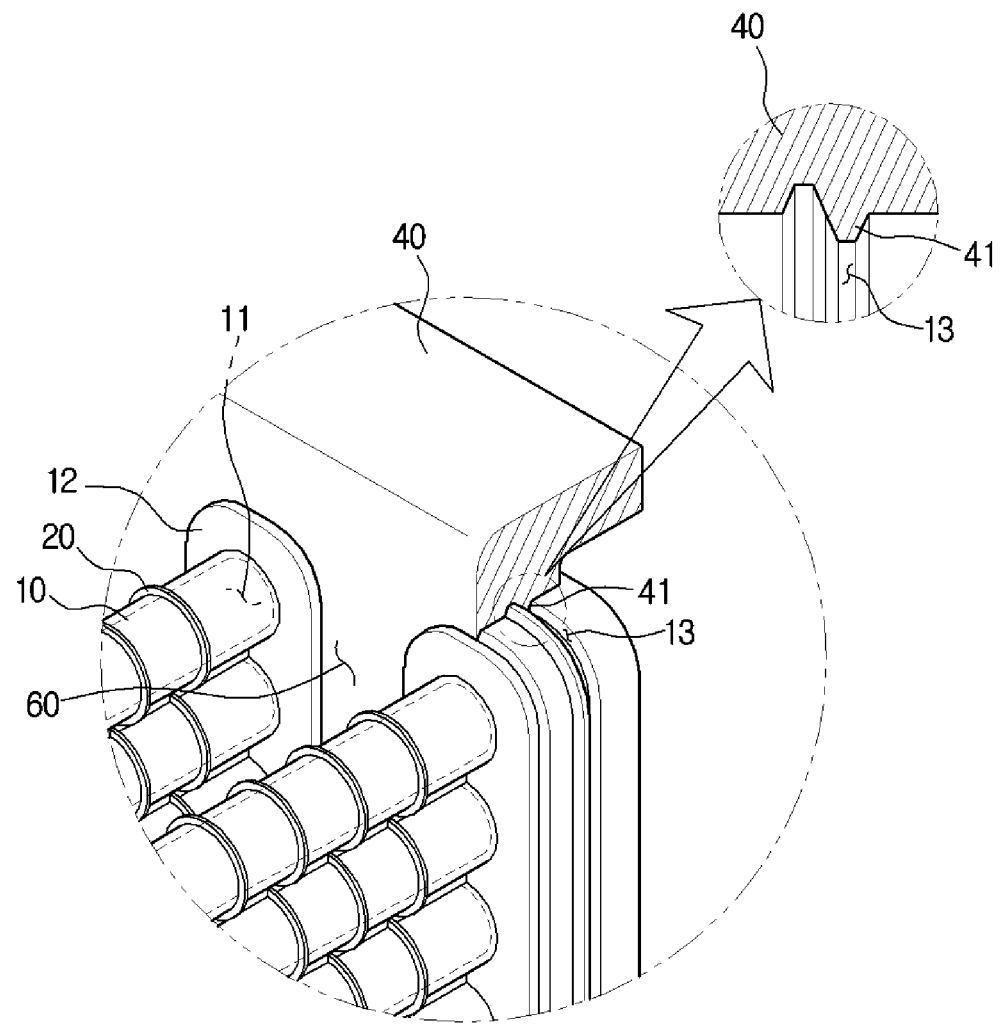

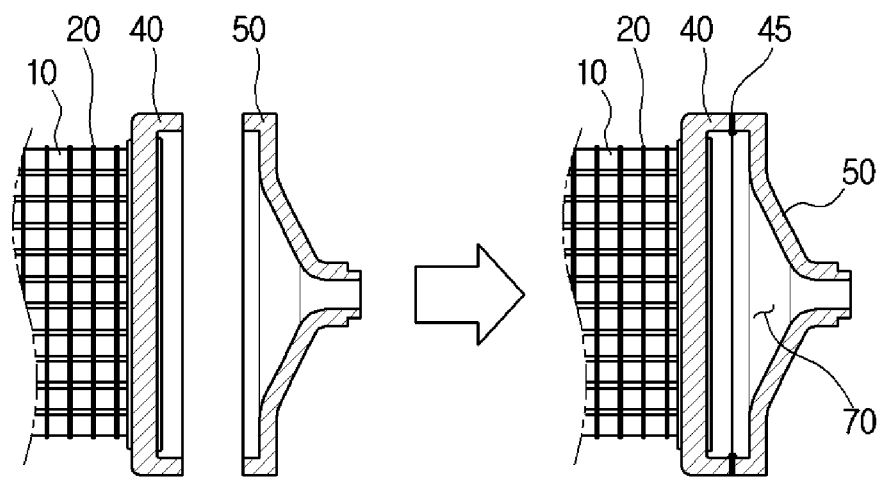
[FIG. 5]

[FIG. 6a]
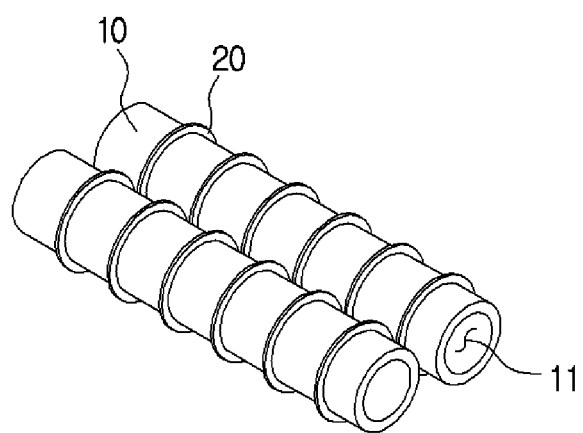

[FIG. 6b]
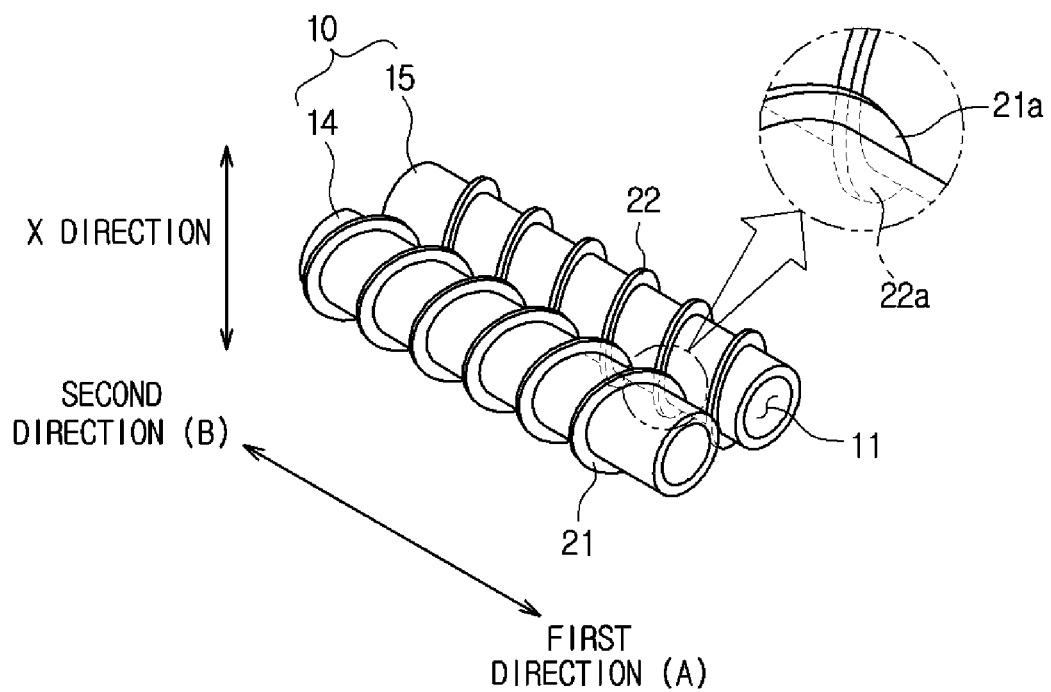

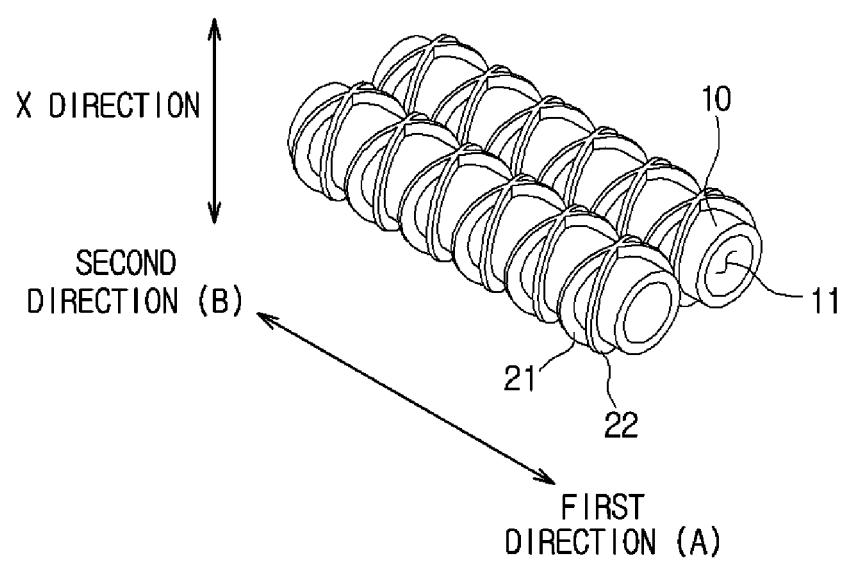
[FIG. 6c]

[FIG. 6d]
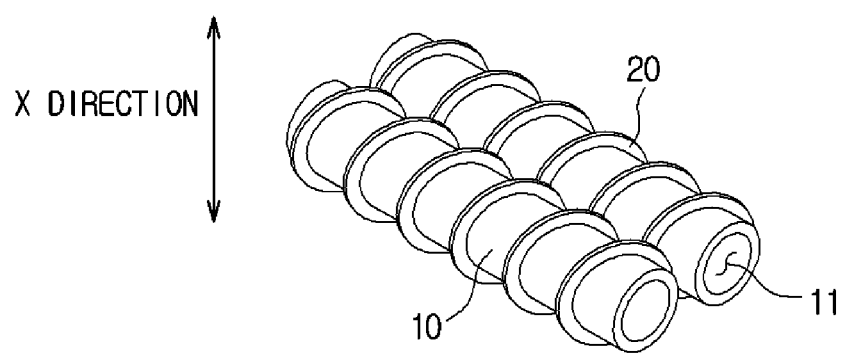

[FIG. 6e]
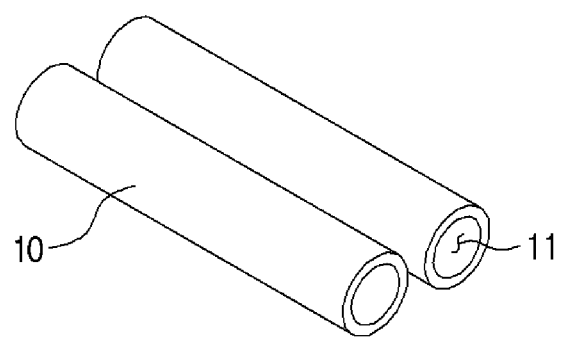

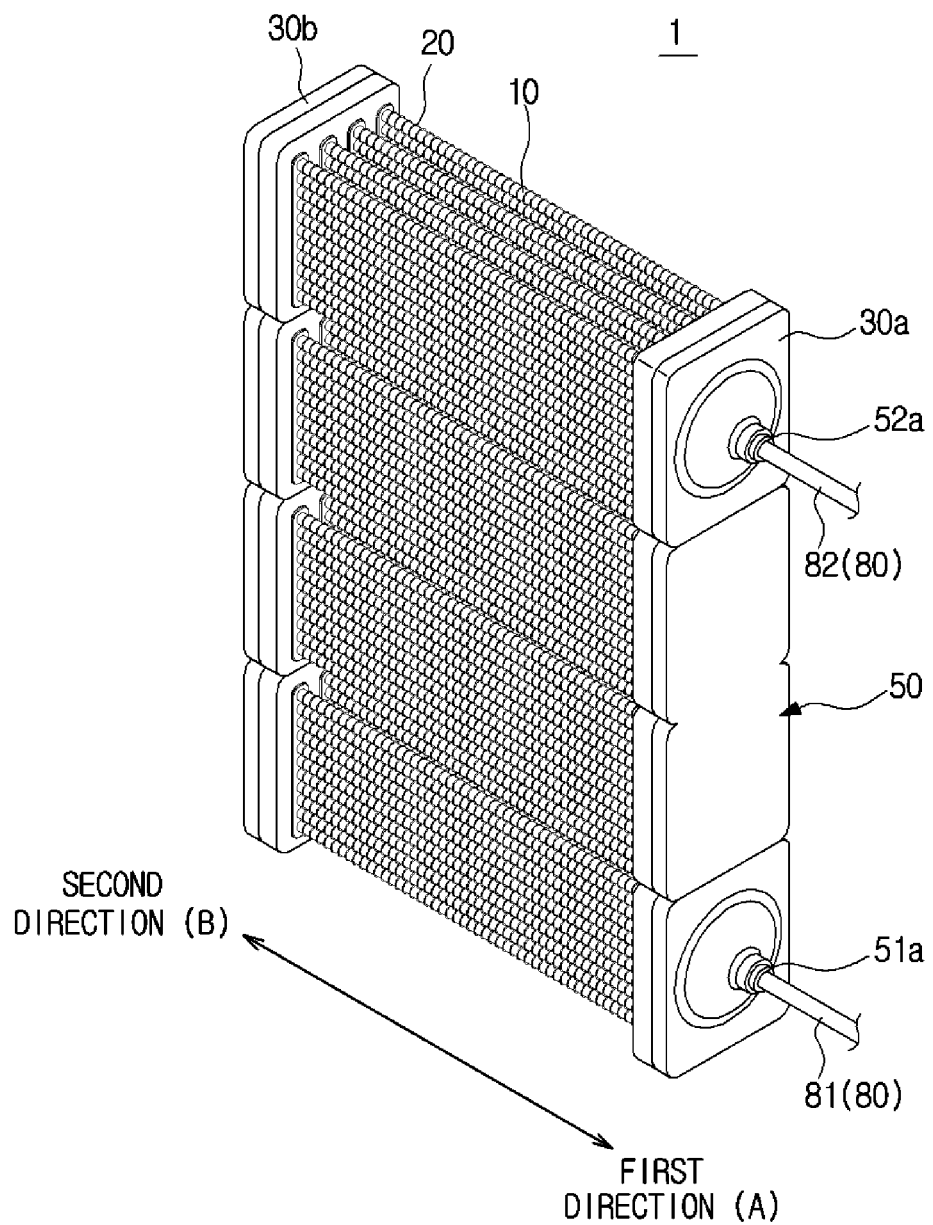

[FIG. 8]
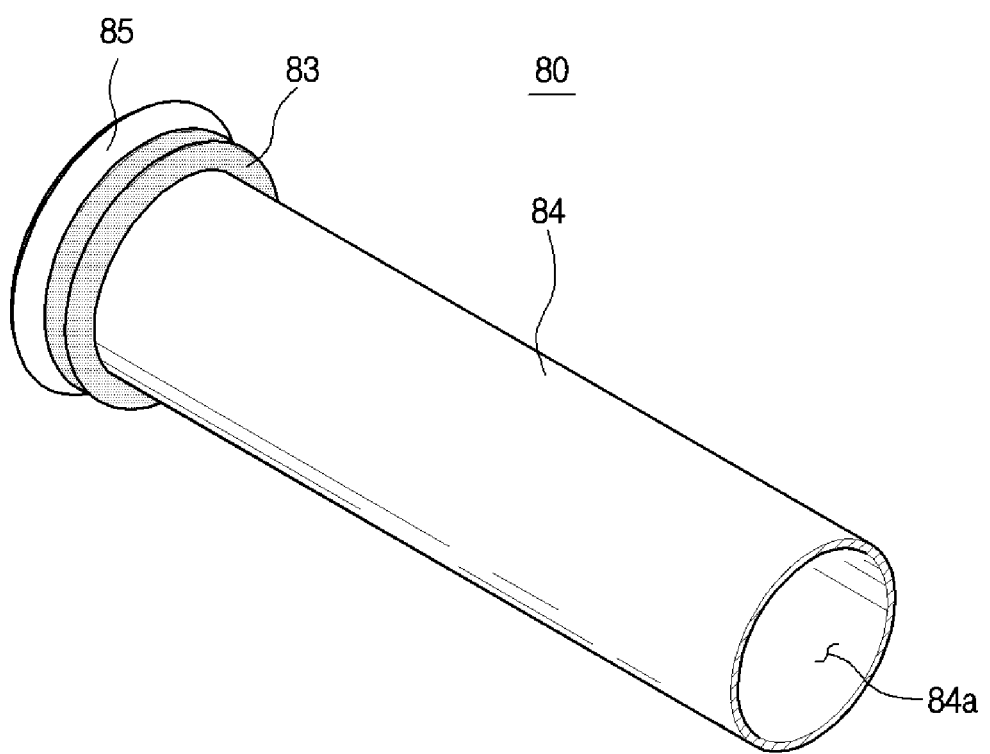

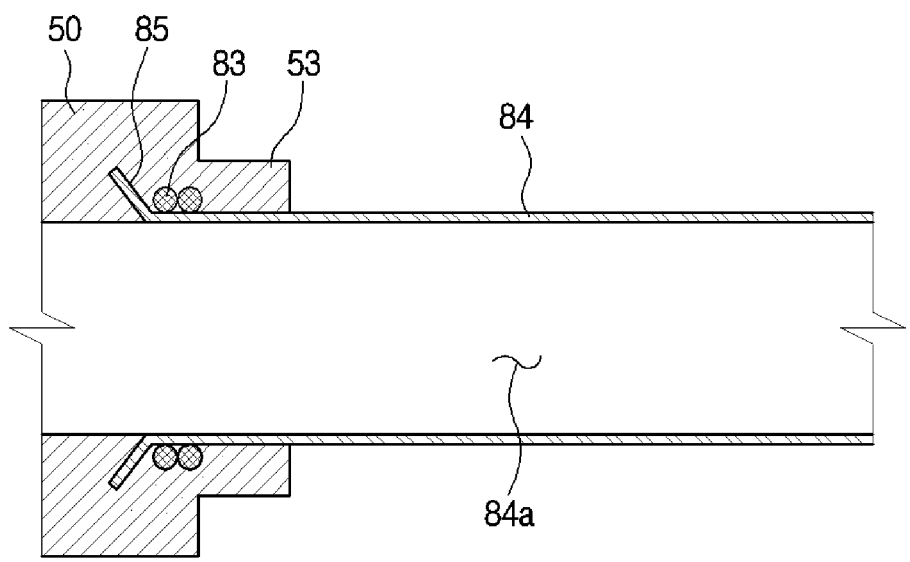
[FIG. 9]

[FIG. 10]
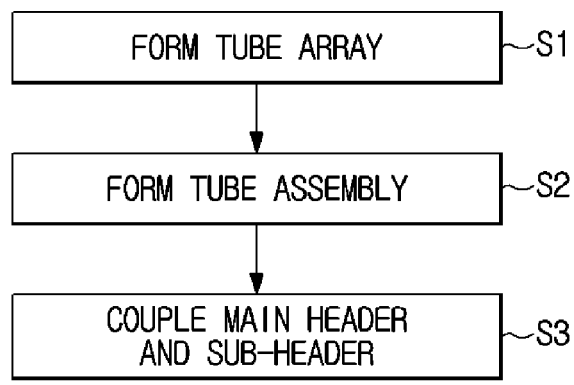

[FIG. 11a]
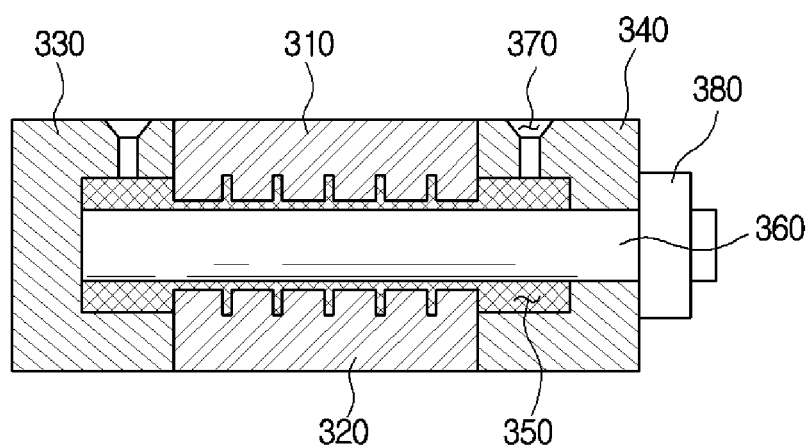

[FIG. 11b]
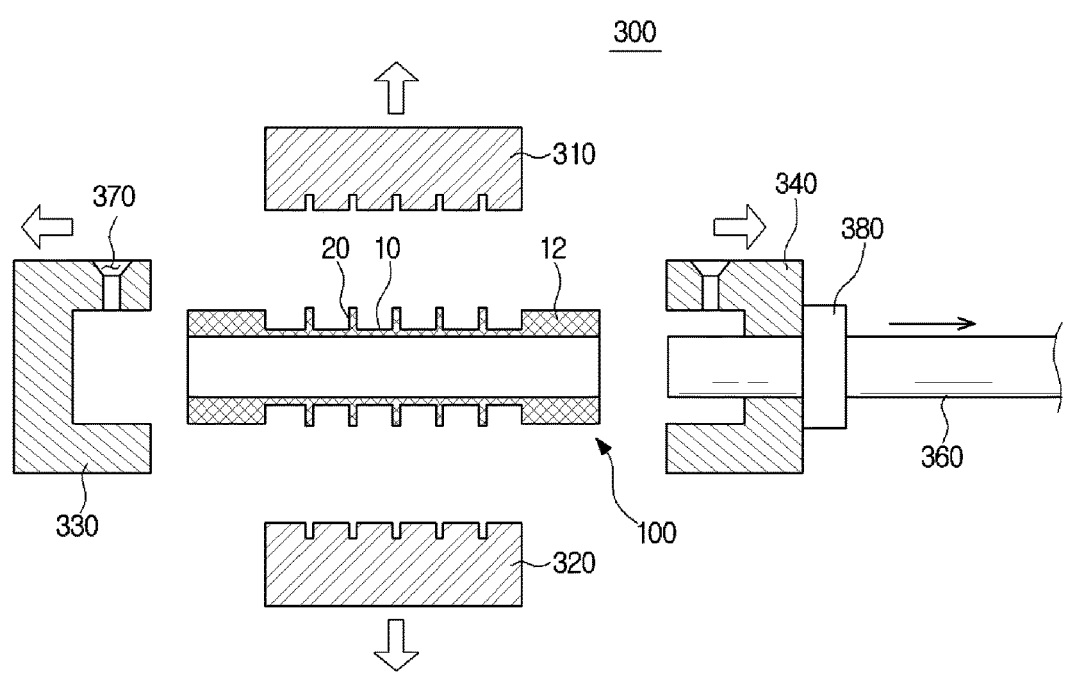

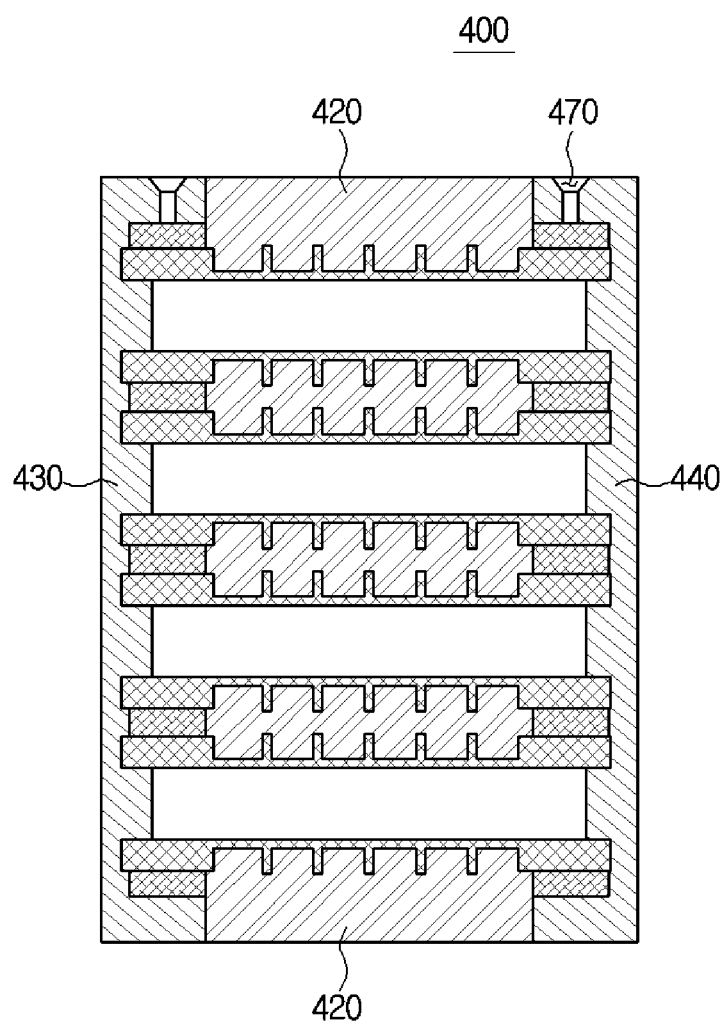
[FIG. 12a]

【FIG. 12b】
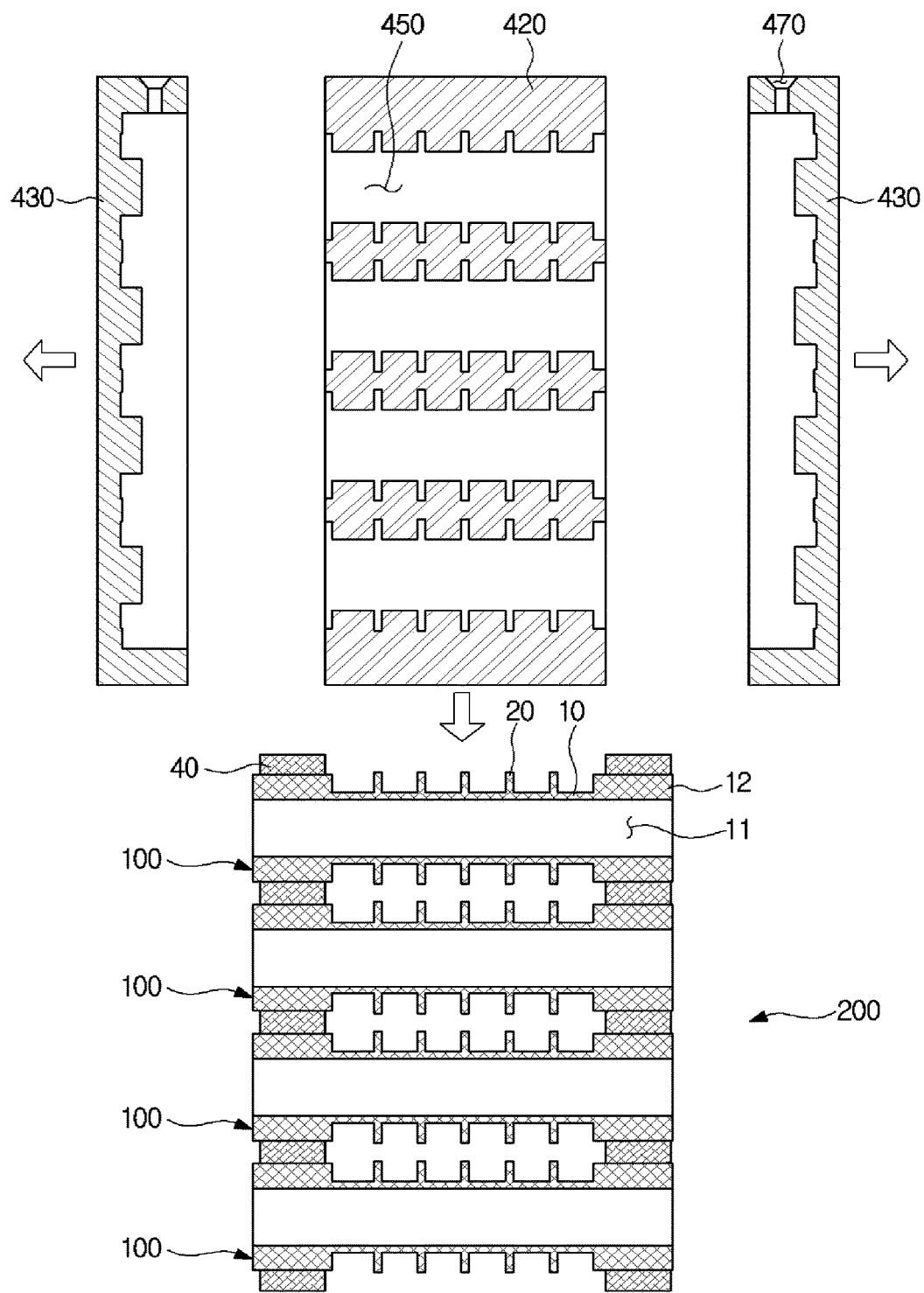

[FIG. 13]
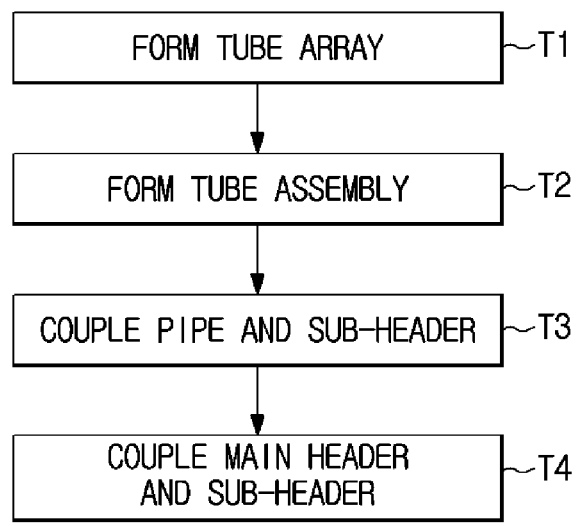

HEAT EXCHANGER AND METHOD FOR MANUFACTURING SAME

CROSS-REFERENCE TO RELATED APPLICATIONS

This application is a U.S. National Stage Application, which claims the benefit under 35 U.S.C. § 371 of PCT International Patent Application No. PCT/KR2015/002568, filed Mar. 17, 2015, which claims the foreign priority benefit under 35 U.S.C. § 119 of Korean Patent Application No. 10-2014-0032198, filed Mar. 19, 2014, the contents of which are incorporated herein by reference.

TECHNICAL FIELD

Embodiments of the present invention relate to a heat exchanger having an improved structure capable of enhancing heat exchange efficiency, and a method of manufacturing the same.

BACKGROUND ART

In general, a heat exchanger is an apparatus which includes a tube in which refrigerant flows and exchanges heat with ambient air, a heat exchange fin coming into contact with the tube so as to enlarge a heat radiation area, and headers communicating with opposite ends of the tube and, as such, refrigerant exchanges heat with ambient air. The heat exchanger includes an evaporator or a condenser, and may form a refrigeration cycle system together with a compressor to compress refrigerant and an expansion valve to expand refrigerant.

In general, the tube of the heat exchanger has a tubular shape made of a copper material and the heat exchange fin has a thin plate shape made of an aluminum material.

The tube and heat exchange fin of the heat exchanger made of a metal material exhibit difficulty in shape deformation, thereby causing an increase in manufacturing costs during shape deformation thereof.

In addition, since the tube is generally manufactured by welding, refrigerant leakage may frequently occur through a gap generated during welding.

Accordingly, for manufacture of a heat exchanger which includes a metal tube and a metal heat exchange fin, complicated manufacturing processes such as a welding process and a refrigerant leakage inspection process are received. For this reason, manufacturing costs of the heat exchanger are increased and a long time is taken to manufacture the heat exchanger.

DISCLOSURE

Technical Problem

It is an aspect of the present invention to provide a heat exchanger having an improved structure capable of enlarging a heat exchange area between refrigerant and ambient air, and a method of manufacturing the same.

It is another aspect of the present invention to provide a heat exchanger having an improved structure capable of simultaneously satisfying mass production and cost reduction, and a method of manufacturing the same.

It is a further aspect of the present invention to provide a heat exchanger having an improved structure capable of preventing refrigerant leakage, and a method of manufacturing the same.

Technical Solution

In accordance with one aspect of the present invention, a heat exchanger includes at least one tube array in which refrigerant flows, the tube array includes a plurality of tubes each having a channel formed therein and connection members coupled to opposite ends of the tubes so as to interconnect the tubes, and the tubes are injection molded integrally with the connection members.

The tubes and the connection members may be made of a polymeric material.

The heat exchanger may further include headers coupled to opposite ends of the tube array.

The headers may include main headers respectively coupled to the opposite ends of the tube array, and the main headers may be injection molded so as to be coupled to the opposite ends of the tube array.

The tube array may include a plurality of tube arrays arranged in parallel, and the main headers may be injection molded so as to be coupled to opposite ends of the tube arrays to form a tube assembly configured by interconnecting the tube arrays.

The main headers may be made of a polymeric material.

The main headers may be injection molded so as to be coupled to the connection members, and each of the connection members may be formed, at an outer surface thereof, with at least one refrigerant leakage prevention groove recessed inward of the connection member.

Each of the headers may further include a sub-header coupled to an outer side of the corresponding main header so as to form a refrigerant flow passage, and a coupling method of the sub-header and the main header may include a thermal bonding method or an induction heating method.

A plurality of cooling fins may be provided at an outer peripheral surface of each tube, and the cooling fins may be injection molded integrally with the tube and the connection members.

The cooling fins may be made of a polymeric material.

A plurality of cooling fins may be provided at an outer peripheral surface of each tube, and the cooling fins may each have an annular shape and be arranged along the outer peripheral surface of the tube in a longitudinal direction of the tube.

The cooling fins may each have an inclined annular shape.

The cooling fins may include first cooling fins each having an annular shape inclined toward one end of each tube and second cooling fins each having an annular shape inclined toward the other end of the tube, and the first and second cooling fins may form at least one intersection point.

The tubes may include a first tube provided, on an outer peripheral surface thereof, with the first cooling fins and a second tube adjacent to the first tube, the second cooling fins being provided at an outer peripheral surface of the second tube, and facing ends of the first and second cooling fins may be alternately arranged in the longitudinal direction of the tubes.

The sub-header may be made of a polymeric material, and the sub-header may include an inflow header having an inlet through which the refrigerant is introduced toward the tubes and an outflow header having an outlet through which the refrigerant is discharged.

The heat exchanger may further include a pipe connected to at least one of the inlet and the outlet such that the refrigerant flows through the pipe, the pipe being made of a material different from the sub-header, and the pipe may be inserted into the sub-header during injection molding thereof so as to be formed integrally with the sub-header.

The pipe may be made of a copper (Cu) material, and a leakage prevention ring may be disposed between the pipe and the sub-header in order to prevent the refrigerant from leaking between the pipe and the sub-header.

The leakage prevention ring may be made of a silicone or rubber material.

In accordance with another aspect of the present invention, a heat exchanger includes a plurality of tubes arranged in parallel such that refrigerant flows through the tubes, headers coupled to opposite ends of the tubes so as to interconnect the tubes, each of the headers having an inlet and an outlet for the refrigerant, and a pipe coupled to at least one of the inlet and the outlet such that the refrigerant flows along the tubes, wherein the pipe is inserted into the header during injection molding thereof so as to be formed integrally with the header.

At least one leakage prevention ring may be disposed between the pipe and the header in order to prevent the refrigerant from leaking between the pipe and the header.

The pipe may include a body therein having a passage in which the refrigerant flows and a neck connected to one end of the body so as to be coupled to at least one of the inlet and the outlet, the neck having a diameter different from the body, and the leakage prevention ring may be disposed on an outer peripheral surface of the body so as to be close to the neck.

The neck may have a larger diameter than the body, and the diameter of the neck may be reduced with decreasing distance to the body.

The header may include a protrusion portion protruding outward of the header so as to provide the inlet and the outlet, and the body may be coupled to at least one of the inlet and the outlet such that the leakage prevention ring is located inside the protrusion portion.

In accordance with another aspect of the present invention, a heat exchanger includes a plurality of tubes each having a channel formed therein, the tubes being arranged in parallel, a plurality of cooling fins coupled to a surface of each tube, the cooling fins being spaced apart from each other in a longitudinal direction of the tube, and headers coupled to opposite ends of the tubes, wherein the tubes are injection molded integrally with the cooling fins.

In accordance with a further aspect of the present invention, a method of manufacturing a heat exchanger includes integrally injection molding a plurality of tubes and connection members coupled to opposite ends of the tubes so as to form at least one tube array, injection molding main headers to opposite ends of the tube array, and coupling a sub-header to an outer side of each of the main headers so as to form a refrigerant flow passage by coupling of the main header and the sub-header.

The tube array may include a plurality of tube arrays, the tube arrays may be arranged in parallel, and the main headers may be injection molded by coupling the main headers to the opposite ends of the tube arrays.

A plurality of cooling fins may be provided at an outer peripheral surface of each tube, and the cooling fins may be injection molded integrally with the tube and the connection members.

A coupling method of the sub-header and the corresponding main header may include a thermal bonding method or an induction heating method.

Each of the connection members may be formed, at an outer surface thereof, with at least one refrigerant leakage prevention groove recessed inward of the connection member.

The sub-header may be injection molded by inserting a pipe, through which refrigerant flows, into the sub-header.

The sub-header may be injection molded by inserting the pipe into the sub-header such that a portion of the pipe is located outside the sub-header.

The sub-header may be injection molded by inserting the pipe into the sub-header in a state in which a leakage prevention ring is disposed on an outer peripheral surface of the pipe in order to prevent the refrigerant from leaking between the pipe and the sub-header.

A first mold may be coupled to a second mold, a third mold may be coupled to a fourth mold so as to form a molding space together with the first and second molds, a piston core may be inserted into the molding space such that each of the tubes has a channel therein through which refrigerant flows, resin may be injected into the molding space so as to injection mold the tube array, and the piston core may be separated from the molding space after separation of the first, second, third, and fourth molds from one another.

The first mold may be coupled to the second mold so as to form shapes of the tubes and the cooling fins.

The third and fourth molds may be coupled to the first and second molds so as to form shapes of the connection members.

Advantageous Effects

As is apparent from the above description, it may be possible to enhance heat exchange efficiency by integrally forming a tube and a cooling fin with a polymeric material and thus by enlarging a contact area between refrigerant flowing in the tube and ambient air.

It may be possible to reduce process costs since the tube made of a polymeric material may be produced in quantity by injection and extrusion molding. In addition, a lightweight heat exchanger may be obtained due to characteristics of the polymeric material.

Since shape deformation of the polymeric tube is easy, the polymeric tube may properly correspond to deformation of products using the heat exchanger.

It may be possible to improve coupling reliability between a main header and a connection member by forming at least one refrigerant leakage prevention groove on an outer surface of the connection member and thus to prevent refrigerant leakage between the main header and the connection member.

DESCRIPTION OF DRAWINGS

These and/or other aspects of the disclosure will become apparent and more readily appreciated from the following description of the embodiments, taken in conjunction with the accompanying drawings of which:

FIG. 1 is a perspective view illustrating an external appearance of a heat exchanger according to an embodiment of the present invention;

FIG. 2 is an exploded perspective view illustrating the heat exchanger according to the embodiment of the present invention;

FIG. 3 is a perspective view illustrating tube arrays and one tube assembly of the heat exchanger according to the embodiment of the present invention;

FIG. 4 is an enlarged view illustrating a coupling structure between connection members and one main header of the heat exchanger according to the embodiment of the present invention;

FIG. 5 is a view illustrating a process of coupling one main header and one sub-header of the heat exchanger according to the embodiment of the present invention;

FIGS. 6A and 6E are views illustrating various shapes of cooling fins of the heat exchanger according to the embodiment of the present invention;

FIG. 7 is a perspective view illustrating a coupled state of pipes to the heat exchanger according to the embodiment of the present invention;

FIG. 8 is a perspective view illustrating one pipe coupled to the heat exchanger according to the embodiment of the present invention;

FIG. 9 is an enlarged cross-sectional view illustrating a coupling structure of one pipe and the heat exchanger according to the embodiment of the present invention;

FIG. 10 is a flowchart illustrating a method of manufacturing the heat exchanger according to the embodiment of the present invention;

FIGS. 11A and 11B are views illustrating a process of manufacturing one tube array of the heat exchanger according to the embodiment of the present invention;

FIGS. 12A and 12B are views illustrating a process of manufacturing one tube assembly of the heat exchanger according to the embodiment of the present invention; and FIG. 13 is a flowchart illustrating a method of manufacturing the heat exchanger according to another embodiment of the present invention.

MODE FOR INVENTION

Reference will now be made in detail to the exemplary embodiments of the present disclosure, examples of which are illustrated in the accompanying drawings, wherein like reference numerals refer to like elements throughout. In addition, terms such as, "front end", "rear end", "upper portion", "lower portion", "upper end", and "lower end" are defined with respect to the drawings, and the shape and the position of the components are not limited to the terms. Hereinafter, reference numeral S may represent a sample.

FIG. 1 is a perspective view illustrating an external appearance of a heat exchanger according to an embodiment of the present invention. FIG. 2 is an exploded perspective view illustrating the heat exchanger according to the embodiment of the present invention. FIG. 3 is a perspective view illustrating tube arrays and one tube assembly of the heat exchanger according to the embodiment of the present invention.

As shown in FIGS. 1 to 3, a heat exchanger, which is designated by reference numeral 1, may include a tube array 100 and a tube assembly 200 as configuration units thereof.

The heat exchanger 1 may include at least one tube array 100 within which refrigerant flows.

The tube array 100 may be formed by coupling a plurality of tubes 10, and the tube assembly 200 may be formed by coupling a plurality of tube arrays 100. The heat exchanger 1 may be formed by coupling at least one tube assembly 200.

The heat exchanger 1 may include a plurality of tubes 10, a plurality of cooling fins 20, and headers 30a and 30b.

The tubes 10 may be arranged in parallel.

Each of the tubes 10 may have a channel 11 formed therein such that refrigerant as a fluid may flow along the channel 11.

The refrigerant exchanges heat with ambient air while undergoing phase change (compression) from gas phase to liquid phase, or exchanges heat with ambient air while undergoing phase change (expansion) from liquid phase to gas phase. The heat exchanger 1 is used as a condenser when the refrigerant undergoes phase change from gas phase to liquid phase, whereas the heat exchanger 1 is used as an evaporator when the refrigerant undergoes phase change from liquid phase to gas phase.

The tubes 10 may be made of a polymeric material.

The polymeric material may include nylon, PVC (polyvinyl chloride), PC (polycarbonate), or ABS (acrylonitrile butadiene styrene) resin.

The tubes 10 may be formed by extrusion and injection molding. Hereinafter, the tubes 10 are regarded as being formed by injection molding for convenience of description.

Opposite ends of the tubes 10 in each tube array 100 may be coupled to connection members 12, respectively.

The connection members 12 may be coupled to opposite ends of the tubes 10, respectively, so as to form one tube array 100.

The connection members 12 may be made of a polymeric material, similarly to the tubes 10.

In addition, the connection members 12 may be injection molded integrally with the tubes 10.

The headers 30a and 30b may include a first header 30a and a second header 30b which are respectively coupled to outer sides of the connection members 12. The first and second headers 30a and 30b may be coupled to the outer sides of the connection members 12 such that the first header 30a is directed in a first direction A and the second header 30b is directed in a second direction B. The first and second headers 30a and 30b are spaced apart from each other by a predetermined distance, and the tubes 10 may be disposed between the first and second headers 30a and 30b.

The first header 30a may communicate with ends of the tubes 10 directed in the first direction A, namely, one end of each tube 10, and the second header 30b may communicate with ends of the tubes 10 directed in the second direction B, namely, the other end of each tube 10.

However, the arrangement of the header 30a and 30b and the tubes 10 is not limited to the above structure.

Each of the first and second headers 30a and 30b may include main headers 40 and a sub-header 50.

The main headers 40 may be respectively coupled to opposite ends of a plurality of tube arrays 100 so as to interconnect the tube arrays 100 for formation of one tube assembly 200.

The main headers 40 may be made of a polymeric material.

The main headers 40 may be injection molded so as to be coupled to the opposite ends of the tube arrays 100. Specifically, each of the main headers 40 may be formed around the outer sides of the corresponding connection members 12 by injection molding so as to form the tube assembly 200.

The sub-header 50 may be coupled to outer sides of the main headers 40 so as to interconnect a plurality of tube assemblies 200.

The sub-header 50 may be made of a polymeric material.

The sub-header 50 may be coupled to the outer sides of the main headers 40 so as to form a refrigerant flow passage 70.

The refrigerant flow passage 70 serves as a chamber through which refrigerant supplied from the outside is supplied to the tubes 10 in a distributed manner.

The sub header 50 may include an inflow header 51 and an outflow header 52. The inflow header 51 may be formed with an inlet 51a through which refrigerant is introduced toward the tubes 10, and the outflow header 52 may be formed with an outlet 52a through which refrigerant is discharged from the tubes 10.

The inflow header 51 may be provided at one of the first and second headers 30a and 30b and the outflow header 52 may also be provided at the other of the first and second headers 30a and 30b, such that the inflow header 51 and the outflow header 52 are directed in different directions.

The tube assemblies 200 may have a stacked structure.

The tube assemblies 200 may have a vertically stacked structure.

When the tube assemblies 200 are vertically stacked, the refrigerant flow passage 70 may vertically guide the flow of refrigerant which sequentially flows through the tubes 10. In addition, the inflow header 51 and the outflow header 52 may be vertically arranged. The outflow header 52 may be disposed above the inflow header 51.

Both of the inflow header 51 and the outflow header 52 may be provided at either of the first header 30a and the second header 30b so as to be directed in the same direction.

As described above, the inflow header 51 may be provided at one of the first and second headers 30a and 30b and the outflow header 52 may also be provided at the other of the first and second headers 30a and 30b, such that the inflow header 51 and the outflow header 52 are directed in different directions.

The cooling fins 20 on each tube 10 may be coupled to a surface of the tube 10 such that refrigerant flowing along the channel 11 of the tube 10 may efficiently exchange heat with ambient air.

The cooling fins 20 on each tube 10 may be arranged to be spaced apart from one another at regular intervals in a longitudinal direction of the tube 10. The cooling fins 20 may be coupled to the outer peripheral surface of the tube 10 so as to serve to enlarge a contact area between ambient air and refrigerant flowing along the channel 11 of the tube 10.

The cooling fins 20 may be made of a polymeric material.

The cooling fins 20 on each tube 10 may be injection molded integrally with the corresponding tube 10.

The cooling fins 20 provided at a plurality of tubes 10 may be injection molded integrally with the tubes 10 and the connection members 12 to interconnect the tubes 10.

The cooling fins 20 may have various shapes, and a detailed description thereof will be given below.

The heat exchanger 1 may further include air flow passages 60 along which ambient air moves.

Each of the air flow passages 60 may be formed between adjacent ones of the tube arrays 100.

The air flow passage 60 may be arranged in a direction perpendicular to the longitudinal direction of the tubes 10 in the adjacent tube arrays 100. That is, the flow of ambient air moving along the air flow passage 60 may be perpendicular to the flow of refrigerant flowing along the channels 11 in the adjacent tube arrays 100.

FIG. 4 is an enlarged view illustrating a coupling structure between the connection members and one main header of the heat exchanger according to the embodiment of the present invention. Reference numerals not shown in this drawing can be seen from FIGS. 1 to 3.

As shown in FIG. 4, the main header 40 may be coupled to the outer sides of the connection members 12 so as to form one tube assembly 200.

Each of the connection members 12 may be formed, at an outer surface thereof, with at least one refrigerant leakage prevention groove 13 recessed inward of the connection member 12.

The refrigerant leakage prevention groove 13 may be formed along an outer peripheral surface of the connection member 12 so as to form a closed loop in a longitudinal direction of the corresponding connection member 12.

The refrigerant leakage prevention groove 13 may be coupled to an insertion protrusion portion 41 protruding from the main header 40. The insertion protrusion portion 41 may have a closed loop shape corresponding to the refrigerant leakage prevention groove 13.

Through coupling of the refrigerant leakage prevention groove 13 and the insertion protrusion portion 41, the connection member 12 may be securely coupled to the main header 40 and, as such, refrigerant may be hermetically maintained.

The insertion protrusion portion 41 may be formed by filling the refrigerant leakage prevention groove 13 of the connection member 12 with an injection molded product during the injection molding process of the main header 40.

FIG. 5 is a view illustrating a process of coupling one main header and one sub-header of the heat exchanger according to the embodiment of the present invention.

As shown in FIG. 5, the sub-header 50 may be coupled to the outer side of the main header 40 to form the refrigerant flow passage 70.

Coupling portions 45 of the main header 40 and the sub-header 50 may be formed along edges of the main header 40 and the sub-header 50.

A coupling method of the main header 40 and the sub-header 50 may include a thermal bonding method or an induction heating method. Specifically, the thermal bonding method is a method of bonding the main header 40 and the sub-header 50 by simultaneously fusing and pressing the coupling portions 45 with a thermal bonding jig (not shown) having a temperature equal to or greater than melting points of the main header 40 and the sub-header 50. The induction heating method is a method of bonding the main header 40 and the sub-header 50 by inserting a metal member (not shown) between the coupling portions 45 and then inducing an external magnetic field or an external electric field.

The refrigerant leakage may be prevented by securely coupling the main header 40 and the sub-header 50.

FIGS. 6A and 6E are views illustrating various shapes of the cooling fins of the heat exchanger according to the embodiment of the present invention. Reference numerals not shown in these drawings can be seen from FIGS. 1 to 3. In addition, redundant description thereof will be omitted.

As shown in FIGS. 6A to 6D, the cooling fins 20 may be provided at the outer peripheral surface of each tube 10.

The cooling fins 20 may have an annular shape.

The cooling fins 20 on each tube 10 may be arranged to be spaced along the outer peripheral surface of the tube 10 in the longitudinal direction of the tube 10.

The cooling fins 20 may have an annular shape inclined on the basis of a perpendicular direction X to the tubes 10.

The cooling fins 20 may be variously inclined.

For convenience of description, it is assumed that a plurality of cooling fins 20 includes first cooling fins 21 and second cooling fins 22. Each of the first cooling fins 21 has an annular shape inclined toward one end of the tube 10 formed with the first cooling fins 21 in the first direction A on the basis of the perpendicular direction X to the tube 10, whereas each of the second cooling fins 22 has an annular shape inclined toward the other end of the tube 10 formed with the second cooling fins 22 in the second direction B on the basis of the perpendicular direction X to the tube 10 (see FIG. 6B).

The first and second cooling fins 21 and 22 may be provided at the surface of each tube 10 to form at least one intersection point. For example, the first and second cooling fins 21 and 22 on each tube 10 may intersect in an "X-shape" to form one intersection point (see FIG. 6C).

For convenience of description, it is assumed that a plurality of tubes 10 includes a first tube 14 and a second tube 15 adjacent thereto. First cooling fins 21 may be provided at an outer peripheral surface of the first tube 14, and second cooling fins 22 may be provided at an outer peripheral surface of the second tube 15. Ends 21a and 22a of the first and second cooling fins 21 and 22 facing each other may be alternately arranged in the longitudinal direction of the tubes 10 (see FIG. 6D).

Meanwhile, as shown in FIG. 6E, the cooling fins 20 may be removed from the outer peripheral surface of each tube 10 (see FIG. 6E).

However, when the cooling fins 20 are provided at the surface of each tube 10, a contact area between ambient air and refrigerant flowing along the channel 11 of the tube 10 is increased and a turbulent flow is accelerated by the cooling fins 20. Therefore, it may be possible to expect an improvement in heat exchange performance of 20~25%, compared to removal of the cooling fins 20.

Particularly, as shown in FIG. 6B, when the ends 21a and 22a of the first and second cooling fins 21 and 22 facing each other are alternately arranged, the contact area between ambient air and refrigerant is large and thermal resistance in the contact area is small. Thereby, a maximum improvement in heat exchange performance may be obtained.

The cooling fins 20 may have a semispherical shape protruding outward of each tube 10.

The cooling fins 20 may have various shapes, but the present invention is not limited thereto.

FIG. 7 is a perspective view illustrating a coupled state of pipes to the heat exchanger according to the embodiment of the present invention. FIG. 8 is a perspective view illustrating one pipe coupled to the heat exchanger according to the embodiment of the present invention. FIG. 9 is an enlarged cross-sectional view illustrating a coupling structure of one pipe and the heat exchanger according to the embodiment of the present invention. Reference numerals not shown in these drawings can be seen from FIGS. 1 to 3. In addition, redundant description thereof will be omitted.

As shown in FIGS. 7 to 9, the heat exchanger 1 may further include a pipe 80 coupled to at least one of the inlet 51a and the outlet 52a.

The pipe 80 may be made of a material different from the sub-header 50.

The pipe 80 may be made of a copper (Cu) material.

When the heat exchanger 1 is used as an evaporator, liquid phase or gas phase refrigerant, having low-temperature and low-pressure, passing through an expansion valve (not shown) may be introduced into a first pipe 81 coupled to the inlet 51a. The refrigerant introduced into the first pipe 81 may be evaporated by absorbing heat from the outside during passage through the tubes 10, and be discharged to the outside through a second pipe 82 coupled to the outlet 52a.

On the contrary, when the heat exchanger 1 is used as a condenser, high-temperature and high-pressure gas phase refrigerant passing through a compressor (not shown) may be introduced through a second pipe 82. The refrigerant may be condensed by emitting heat to the outside during passage through the tubes 10, and the condensed refrigerant may then be discharged to the outside through a first pipe 81.

The pipe 80 may be inserted into the sub-header 50 during injection molding thereof to be integrally formed with the sub-header 50.

At least one leakage prevention ring 83 may be disposed between the pipe 80 and the sub-header 50 in order to prevent refrigerant from leaking between the pipe 80 and the sub-header 50.

The leakage prevention ring 83 may be made of a material capable of resisting high-temperature heat generated during the injection molding of the sub-header 50.

The leakage prevention ring 83 may be made of a silicone or rubber material.

The pipe 80 may include a body 84 and a neck 85.

The body 84 may have a hollow cylindrical shape, and therein have a passage 84a in which refrigerant flows.

The neck 85 may be connected to one end of the body 84 so as to be coupled to at least one of the inlet 51a and the outlet 52a, and have a diameter different from the body 84.

The neck 85 may have a larger diameter than the body 84.

The diameter of the neck 85 may be reduced with decreasing distance to the body 84. That is, the neck 85 may have a funnel shape having an increasing diameter with increasing distance from the body 84.

The leakage prevention ring 83 may be disposed on an outer peripheral surface of the body 84 so as to be close to the neck 85.

The leakage prevention ring 83 may have an annular shape so as to be disposed along the outer peripheral surface of the body 84.

The sub-header 50 may include a protrusion portion 53 protruding outward thereof so as to provide the inlet 51a and the outlet 52a.

The body 84 may be coupled to at least one of the inlet 51a and the outlet 52a such that the leakage prevention ring 83 is located inside the protrusion portion 53.

When the sub-header 50 is injection molded in a state in which the leakage prevention ring 83 is disposed on the outer surface of the pipe 80, the sub-header 50 presses the leakage prevention ring 83 by contraction during the injection molding process of the sub-header 50, thereby enabling refrigerant to be hermetically maintained.

FIG. 10 is a flowchart illustrating a method of manufacturing the heat exchanger according to the embodiment of the present invention. Reference numerals not shown in this drawing can be seen from FIGS. 1 to 3.

As shown in FIG. 10, a method of manufacturing the heat exchanger 1 may include forming tube arrays 100 (S1), forming tube assemblies 200 (S2), and coupling main headers 40 and a corresponding sub-header 50 (S3).

Specifically, one tube array 100 may be formed by integrally injection molding a plurality of tubes 10 and connection members 12 respectively coupled to opposite ends of the tubes 10.

A plurality of cooling fins 20 on each tube 10 may be injection molded integrally with the tube 10 and the corresponding connection members 12 so as to be disposed on an outer peripheral surface of the tube 10.

The tube array 100 may be injection molded such that at least one refrigerant leakage prevention groove 13 recessed inward of each connection member 12 is formed on an outer surface of the connection member 12.

One tube assembly 200 may be formed by inserting a plurality of tube arrays 100 arranged in parallel between the main headers 40 and injection molding the main headers 40 together with the tube arrays 100.

The tube arrays 100 and the main headers 40 may be made of polymeric materials different from each other.

The main headers 40 may be respectively located at opposite ends of a plurality of tube arrays 100.

The sub-header 50 may be injection molded by inserting a pipe 80, in which refrigerant flows, into the sub-header 50. Specifically, the sub-header 50 may be injection molded by inserting the pipe 80 thereinto such that a portion of the pipe 80 is located outside the sub-header 50, namely, such that a portion of the pipe 80 is exposed to the outside.

The sub-header 50 may be coupled to outer sides of the main headers 40 so as to form a refrigerant flow passage 70 by coupling with the main headers 40.

The coupling method of the main header 40 and the sub-header 50 may include a thermal bonding method or an induction heating method.

FIGS. 11A and 11B are views illustrating a process of manufacturing one tube array of the heat exchanger according to the embodiment of the present invention. Reference numerals not shown in this drawing can be seen from FIGS. 1 to 3.

As shown in FIGS. 11A and 11B, the tube array 100 may be formed by a first mold apparatus 300.

The first mold apparatus 300 may include a first mold 310, a second mold 320, a third mold 330, and a fourth mold 340. The first mold 310 is located at an upper side and the second mold 320 is located at a lower side. The third mold 330 is located at a left side and the fourth mold 340 is located at a right side. The first, second, third, and fourth molds 310, 320, 330, and 340 are coupled to one another so as to form a first molding space 350.

The first and second molds 310 and 320 may be coupled to each other so as to form shapes of a plurality of tubes 10 in each tube array 100.

The first and second molds 310 and 320 may be coupled to each other so as to integrally form shapes of the tubes 10 and a plurality of cooling fins 20 provided at each of the tubes 10.

The third and fourth molds 330 and 340 may be coupled to the first and second molds 310 and 320 so as to form respective shapes of the connection members 12.

A piston core 360 may be inserted into the first molding space 350 such that the channel 11 for movement of refrigerant is formed within each of the tubes 10. The piston core 360 may pass through the fourth mold 340 and be inserted into the first molding space 350 such that one end of the piston core 360 comes into contact with an inner surface of the third mold 330.

When the piston core 360 is inserted into the first molding space 350, resin is injected into the first molding space 350 through a plurality of resin gates 370.

After a predetermined time passes, the first, second, third, and fourth molds 310, 320, 330, and 340 are separated from one another and the piston core 360 is finally separated from the first molding space 350, so as to take the polymeric tube array 100 out of the first molding space 350.

The piston core 360 may be separated from the first molding space 350 using an air cylinder 380.

Protrusion portions (not shown) protruding toward the first molding space 350 may be provided at inner surfaces of the third and fourth molds 330 and 340. The protrusion portions provided at the third and fourth molds 330 and 340 may form at least one refrigerant leakage prevention groove 13 at each of the connection members 12. That is, each of the protrusion portions may have a shape corresponding to the refrigerant leakage prevention groove 13.

FIGS. 12A and 12B are views illustrating a process of manufacturing one tube assembly of the heat exchanger according to the embodiment of the present invention. Reference numerals not shown in this drawing can be seen from FIGS. 1 to 3.

As shown in FIGS. 12A and 12B, the tube assembly 200 may be formed by a second mold apparatus 400.

The second mold apparatus 400 may include a fifth mold (not shown), a sixth mold 420, a seventh mold 430, and an eighth mold 440. The fifth mold (not shown) is located at an upper side and the sixth mold 420 is located at a lower side. The seventh mold 430 is located at a left side and the eighth mold 440 is located at a right side. The fifth mold (not shown), the sixth mold 420, the seventh mold 430, and the eighth mold 440 are coupled to one another so as to form a second molding space 450.

The injection molded tube arrays 100 are arranged in parallel and are inserted into the second molding space 450.

When the tube arrays 100 are inserted into the second molding space 450, resin is injected into the second molding space 450 through a plurality of resin gates 470 such that the main headers 40 are formed at opposite ends of the tube arrays 100.

After a predetermined time passes, the fifth mold (not shown), the sixth mold 420, the seventh mold 430, and the eighth mold 440 are separated from one another and the piston core 360 is finally separated from the first molding space 350, so as to take the tube assembly 200 out of the second molding space 450.

FIG. 13 is a flowchart illustrating a method of manufacturing the heat exchanger according to another embodiment of the present invention. Reference numerals not shown in these drawings can be seen from FIGS. 1 to 3. In addition, redundant description of FIG. 10 will be omitted.

As shown in FIG. 13, a method of manufacturing the heat exchanger 1 may include forming tube arrays 100 (T1), forming tube assemblies 200 (T2), coupling a sub-header 50 and a pipe 80 (T3), and coupling main headers 40 and the sub-header 50 (T4).

The sub-header 50 may be injection molded of a polymeric material.

The pipe 80 may be inserted into the sub-header 50 during injection molding of the sub-header 50 such that the pipe 80 is connected to at least one of an inlet 51a and an outlet 52a provided at the sub-header 50.

The sub-header 50 may be injection molded by inserting the pipe 80 into the sub-header 50 in a state in which at least one leakage prevention ring 83 is disposed on an outer peripheral surface of the pipe 80 in order to prevent refrigerant from leaking between the pipe 80 and the sub-header 50. In this case, injection molding conditions of the sub-header 50 may be adjusted so as not to damage the leakage prevention ring 83.

Although the embodiment in which the headers 30a and 30b are coupled to the tube assemblies 200 has been described above, an embodiment in which the headers 30a and 30b are coupled to the tube arrays 100 may also be performed. That is, the main headers 40 may be respectively coupled to opposite ends of each tube array 100 including the tubes 10, and the sub-headers 50 may be coupled to the outer sides of the main headers 40 to form one refrigerant flow passage 70.

The heat exchanger 1 according to the present invention may be applied to various electronic apparatuses including a refrigerator and an air conditioner.

Although a few exemplary embodiments have been shown and described, it would be appreciated by those skilled in the art that changes may be made in these exemplary embodiments without departing from the principles and spirit of the exemplary embodiments, the scope of which is defined in the claims and their equivalents.

The invention claimed is:

1. A heat exchanger comprising at least one tube array in which refrigerant flows, wherein the tube array comprises:
a plurality of tubes each having a channel formed therein and the plurality of tubes disposed to be vertically stacked;
a plurality of cooling fins formed along an outer circumferential surface of the tubes;
connection members having holes in which opposite ends of the tubes are coupled so as to interconnect the tubes and form the tube array; and
headers coupled to the opposite ends of the tubes, the headers including main headers respectively coupled to the opposite ends of the tubes, the main headers being made of a polymeric material and being injection molded so as to be coupled to the connection members,
wherein the tubes, the cooling fins and the connection members are made of a polymeric material and injection molded integrally each other, and
each of the connection members is formed, at an outer surface thereof, with a refrigerant leakage prevention groove recessed inward of the connection member.

2. The heat exchanger according to claim 1, wherein
the at least one tube array comprises a plurality of tube arrays arranged in parallel, and
the main headers are injection molded so as to be coupled to opposite ends of the tube arrays to form a tube assembly configured by interconnecting the tube arrays.

3. The heat exchanger according to claim 1, wherein the main headers are made of a polymeric material.

4. The heat exchanger according to claim 1, wherein
each of the headers further includes a sub-header coupled to an outer side of the corresponding main header so as to form a refrigerant flow passage, and
a coupling method of the sub-header and the main header comprises a thermal bonding method or an induction heating method.

5. The heat exchanger according to claim 1, wherein the cooling fins are injection molded integrally with the tubes and the connection members.

6. The heat exchanger according to claim 1, wherein the cooling fins each have an annular shape, and are arranged along the outer peripheral surface of the tubes in a longitudinal direction of the tubes.

7. The heat exchanger according to claim 6, wherein the cooling fins each have an inclined annular shape.

8. The heat exchanger according to claim 6, wherein the cooling fins comprise:
first cooling fins each having an annular shape inclined toward one end of each tube; and
second cooling fins each having an annular shape inclined toward the other end of the tube, and
wherein the first and second cooling fins form at least one intersection point.

9. The heat exchanger according to claim 8, wherein the tubes comprise:
a first tube provided, on an outer peripheral surface thereof, with the first cooling fins; and
a second tube adjacent to the first tube, the second cooling fins being provided at an outer peripheral surface of the second tube, and
wherein facing ends of the first and second cooling fins are alternately arranged in the longitudinal direction of the tubes.

10. The heat exchanger according to claim 4, wherein each sub-header is made of a polymeric material, and
wherein each sub-header comprises:
an inflow header having an inlet through which the refrigerant is introduced toward the tubes; and
an outflow header having an outlet through which the refrigerant is discharged.

11. The heat exchanger according to claim 10, further comprising:
a pipe connected to at least one of the inlet and the outlet such that the refrigerant flows through the pipe, the pipe being made of a material different from the sub-header, and
wherein the pipe is inserted into the sub-header during injection molding thereof so as to be formed integrally with the sub-header.

12. The heat exchanger according to claim 11, wherein:
the pipe is made of a copper (Cu) material; and
a leakage prevention ring is disposed between the pipe and the sub-header in order to prevent the refrigerant from leaking between the pipe and the sub-header.

13. The heat exchanger according to claim 12, wherein the leakage prevention ring is made of a silicone or rubber material.

14. The heat exchanger according to claim 1, wherein each of the main headers includes an insertion protrusion portion configured to be coupled to the refrigerant leakage prevention groove formed in the respective connection member.

15. A heat exchanger, comprising
a plurality of tubes in which refrigerant flows, each of the tubes having a first end and a second end;
a first connection member having holes in which the first ends of the tubes are coupled;
a second connection member having holes in which the second ends of the tubes are coupled;
a first header coupled to the first connection member, the first header including a first main header that is made of a polymeric material and injection molded so as to be coupled to the first connection member; and
a second header coupled to the second connection member, the second header including a second main header that is made of a polymeric material and injection molded so as to be coupled to the second connection member, wherein
the first connection member and the second connection member interconnect the tubes,
each of the tubes is injection molded integrally with the first connection member and the second connection member,
the first connection member is formed, at an outer surface thereof, with a first refrigerant leakage prevention groove recessed inward of the first connection member, and
the second connection member is formed, at an outer surface thereof, with a second refrigerant leakage prevention groove recessed inward of the second connection member.

* * * * *